(12) United States Patent
Benke et al.

(10) Patent No.: US 11,429,304 B2
(45) Date of Patent: Aug. 30, 2022

(54) MAINTAINING A MEMORY REPLICA OF A PRIMARY COMPUTER SYSTEM

(71) Applicant: INTERNATIONAL BUSINESS MACHINES CORPORATION, Armonk, NY (US)

(72) Inventors: Oliver Benke, Stuttgart (DE); Tobias Ulrich Bergmann, Weinstadt (DE)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/789,574

(22) Filed: Feb. 13, 2020

(65) Prior Publication Data
US 2021/0255770 A1 Aug. 19, 2021

(51) Int. Cl.
| | |
|---|---|
| G06F 3/06 | (2006.01) |
| G06F 11/30 | (2006.01) |
| G06F 11/34 | (2006.01) |
| G06F 11/20 | (2006.01) |

(52) U.S. Cl.
CPC ............. *G06F 3/065* (2013.01); *G06F 3/067* (2013.01); *G06F 3/0619* (2013.01); *G06F 11/2023* (2013.01); *G06F 11/3003* (2013.01); *G06F 11/3037* (2013.01); *G06F 11/3495* (2013.01); *G06F 2201/82* (2013.01)

(58) Field of Classification Search
CPC ........ G06F 3/065; G06F 3/067; G06F 3/0619; G06F 11/2023
USPC ............................................... 711/162
See application file for complete search history.

(56) References Cited

U.S. PATENT DOCUMENTS

| | | | |
|---|---|---|---|
| 8,151,263 | B1 | 4/2012 | Venkitachalam |
| 8,521,694 | B1 | 8/2013 | Natanzon |
| 2014/0258777 | A1 | 9/2014 | Cheriton |
| 2017/0060702 | A1* | 3/2017 | Dave ............... G06F 11/2094 |
| 2018/0129567 | A1* | 5/2018 | Kumarasamy ......... G06F 11/00 |

* cited by examiner

*Primary Examiner* — Than Nguyen
(74) *Attorney, Agent, or Firm* — Jordan T. Schiller

(57) ABSTRACT

A method for maintaining a memory replica of a primary computer system to be used by an alternate computer system is provided. Provided are detecting changes performed on a memory device of the primary computer system by software executed on the primary computer system. Also provided is monitoring at least one memory controller of the primary computer system; triggering, based on the monitoring, a snapshot creation procedure, the snapshot creation procedure comprising creating a memory snapshot that comprises the detected changes.

17 Claims, 4 Drawing Sheets

MAINTAINING A MEMORY REPLICA OF A PRIMARY COMPUTER SYSTEM

The present invention relates in general to data processing systems, in particular, to a method for maintaining a memory replica of a primary computer system to be used by an alternate computer system, a computer program product, a data processing system, a memory replication controller of a primary computer system, as well as a method for processing a memory snapshot received from a primary computer system.

BACKGROUND

For cloning an existing server with state, like a database with loaded tables to a second system various methods are known. Rapidly cloning the running database to a second system may be important for high availability/disaster recovery and (especially in case of OLAP databases) for scalability by rapidly cloning existing instances.

It is known to clone a server using a commercially available system like e.g. VMware vMotion using live guest relocation. This method requires virtualization and may be limited if the server to be relocated is huge.

Further a spin-up second server based on a state stored on a (replicated) storage may be implemented, which takes a long time for spinning up the additional database. The spin-up of the second server is referred to an active/passive setup. This differs from an active/active setup which is the case of a continuously running second server using replicated storage. Because the second server is continuously running, this setup may be associated with high resource consumption.

Further a system called Geographically Dispersed Parallel Sysplex (GDPS) with active/active setup, HyperSwap, etc., or similar High Availability Disaster Recovery (HA/DR) software solutions may be used. These methods need database-specific support. Without significant help from the database, the database cannot be enabled for active/active setup. The database replication protocol may cause high cost (elapsed time, consumed resources). Rapid spawning of additional images is not possible. The secondary system is really active, even if only used for data recovery, thus consuming system resources (CPUs) with associated power consumption permanently.

SUMMARY

A method is proposed for maintaining a memory replica of a primary computer system to be used by an alternate computer system. The method comprises: detecting changes performed on a memory device of the primary computer system by software executed on the primary computer system; monitoring at least one memory controller of the primary computer system; and triggering, based on the monitoring, a snapshot creation procedure, the snapshot creation procedure comprising creating a memory snapshot that comprises the detected changes.

The method according to an embodiment of the invention offers hardware-supported replication of the complete memory and of the current processor states, e.g. registers of the primary system. A synchronization point is determined when it is possible to fail-over, switch, and/or restart in a consistent state on a secondary image. Thus, exploitation of the replicated storage may be performed advantageously.

The network or the storage may favorably be separated from the other components of the primary computer system, using a micro-kernel or an adjusted operating system. The input/output configuration may be system specific and/or pre-configured. Before performing spawning operations on the secondary computer system, a network re-start may be performed and then the original CPU state may be applied, which is by definition somewhere in the user space of the computer systems.

Further, a favourable computer program product is proposed for maintaining a memory replica of a primary computer system to be used by an alternate computer system.

The computer program product comprises a computer readable storage medium having program instructions embodied therewith, the program instructions executable by the computer system to cause the computer system to perform a method comprising: detecting changes performed on a memory device of the primary computer system by software executed on the primary computer system; monitoring at least one memory controller of the primary computer system; and triggering, based on the monitoring, a snapshot creation procedure, the snapshot creation procedure comprising creating a memory snapshot that comprises the detected changes.

Further, a data processing system for execution of a data processing program is proposed, comprising computer readable program instructions for performing the method described above.

Further, a memory replication controller of a primary computer system is proposed, performing a method for maintaining a memory replica of the primary computer system. The method comprises: detecting changes performed on a memory device of the primary computer system by software executed on the primary computer system; monitoring at least one memory controller of the primary computer system; and triggering, based on the monitoring, a snapshot creation procedure, the snapshot creation procedure comprising creating a memory snapshot that comprises the detected changes.

The memory replication controller according to an embodiment of the invention may serve advantageously for performing the maintaining a memory replica of a primary computer system to be used by an alternate computer system and be implemented as part of the primary computer system and the alternate computer system.

Further, a method is proposed for processing a memory snapshot received from a primary computer system. The method comprises: loading the memory snapshot and/or delta pages of the main memory of the primary computer system to the alternate computer system; re-starting the network and/or the input/output subsystem on the alternate computer system; transferring states of the CPUs of the primary computer system; and continuing execution of a primary image on the alternate computer system.

The method for processing a memory snapshot received from the primary computer system according to an embodiment of the invention enables advantageously for rapidly and continuously replicating all memory changes from the primary system to the alternate computer system.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
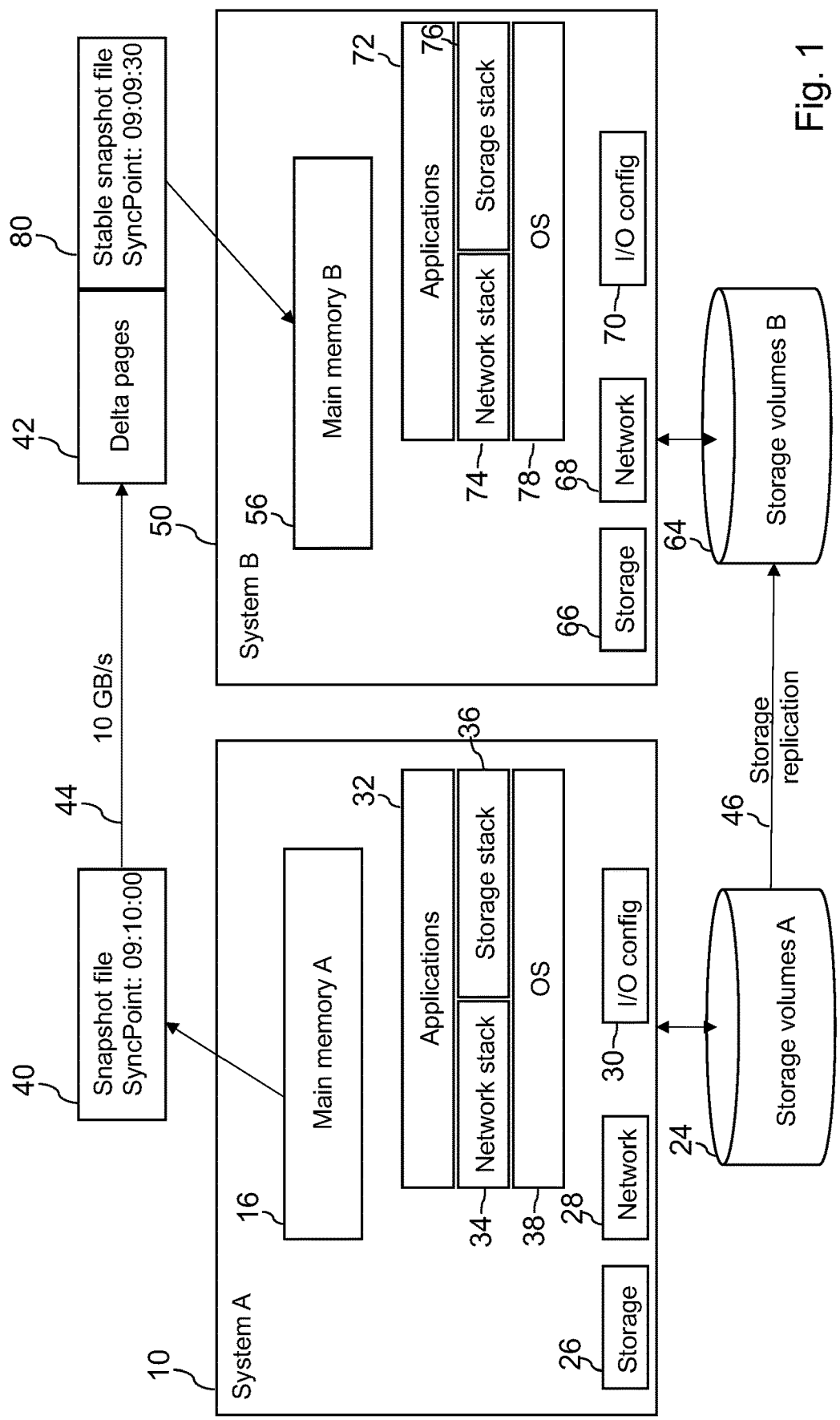
FIG. 1 depicts two computer systems using a method for maintaining a memory replica of a primary computer system to be used by an alternate computer system according to an embodiment of the invention from a software perspective.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method for maintaining a memory replica of a primary computer system to be used by an alternate computer system.

The illustrative embodiments may be used for the method comprising detecting changes performed on a memory device 16 of the primary computer system by software executed on the primary computer system; monitoring at least one memory controller of the primary computer system; and triggering, based on the monitoring, a snapshot creation procedure, the snapshot creation procedure comprising creating a memory snapshot that comprises the detected changes.

The illustrative embodiments are sometimes described herein using particular technologies only as an example for the clarity of the description.

FIG. 1 depicts two computer systems using a method for maintaining a memory replica of a primary computer system to be used by an alternate computer system according to an embodiment of the invention from a software perspective.

The two computer systems 10, 50 exhibit a similar software architecture, comprising an operating system 38, 78, e.g. a microkernel operating system, network stacks 34, 74, storage stacks 36, 76, for running applications 32, 72, as well as a main memory 16, 56. Further the computer systems 10, 50 comprise storage utilities 26, 66, network utilities 28, 68 and an input/output configuration 30, 70. The computer systems 10, 50 are connected to storage volumes 24, 64 where a storage replication 46 may take place for storage volume 24 to storage volume 64.

As an example, a snapshot file 40 may be created at a synchronization point with time 09:10:00 from main memory 16 of the primary computer system 10 to update the main memory 56 of the alternate computer system 50. The snapshot file 40 may transfer delta pages 42 compared to an earlier snapshot file, created at a synchronization point with time 09:09:30.

Figure 2:
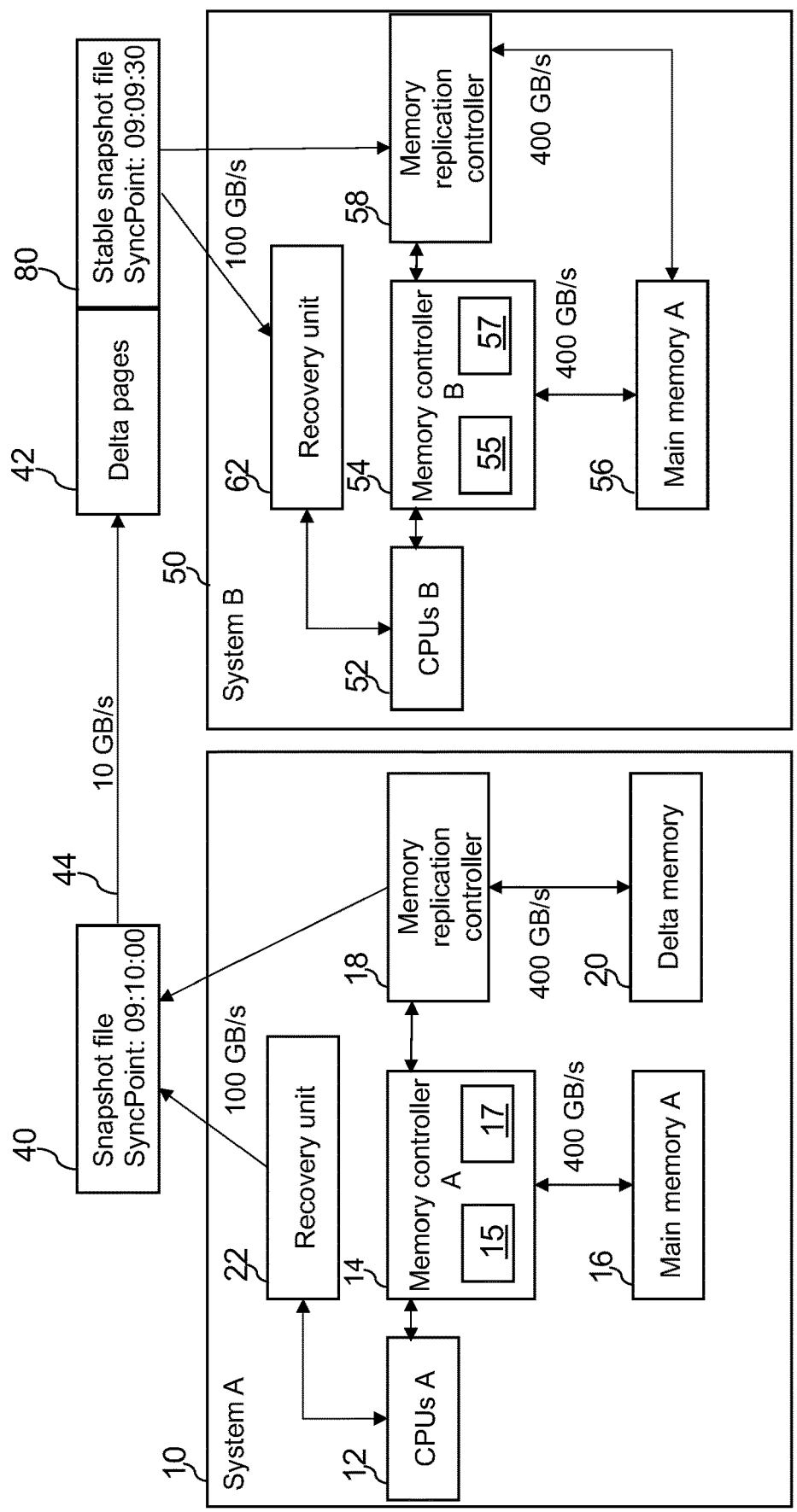
FIG. 2 depicts the two computer systems according to FIG. 1 from a hardware perspective.

FIG. 2 depicts the two computer systems according to FIG. 1 from a hardware perspective.

The two computer systems 10, 50 comprise at least one or more CPUs 12, 52, connected with a memory controller 14, 54 to the main memory 16, 56. The memory controller 14, 54 comprises at least a memory management unit 15, 55 and a cache coherence controller 17, 57. The memory controller 14, 54 is connected to a memory replication controller 18, 58. The memory replication controller 18 of the primary computer system 10 serves for determining delta pages 42 from a delta memory 20. Communication between the memory controller 14, 54 and the main memory 16, 56 as well as between memory replication controller 18 and the delta memory 20 may be performed as high speed communication, e.g. with 400 GB/s. a recovery unit 22, 62 is connected to the CPUs 12, 52 with serves for registering a state of the CPUs 12, 52 and for communicating the snapshot file 40 from the primary computer system 10 to the alternate computer system 50. The memory replication controller 58 of the alternate computer system 50 is directly operating on the main memory 56.

The memory replication controller 18 of the primary computer system 10 may be adapted for detecting changes performed on a memory device 16 of the primary computer system 10 by software executed on the primary computer system 10; monitoring at least one memory controller 14 of the primary computer system 10; and triggering, based on the monitoring, a snapshot creation procedure, the snapshot creation procedure comprising creating a memory snapshot 40 that comprises the detected changes.

Transfer of data between the recovery unit 22, 62 and the snapshot file 40, 80 may be performed at e.g. 100 GB/s, whereas the transfer of the snapshot file 40 to the alternate computer system 50 may be performed at a lower speed of e.g. 10 GB/s (44).

According to the inventive method, changes may be detected performed on a memory device 16, e.g. the main memory A, of the primary computer system 10 by software executed on the primary computer system 10 by monitoring at least one memory controller 14, e.g. the memory controller A, of the primary computer system 10. As long as the changes are detected, based on the monitoring, a snapshot creation procedure is triggered, wherein the snapshot creation procedure comprises creating a memory snapshot 40 that comprises the detected changes.

The at least one memory controller 14 comprises a cache coherence controller 17. By monitoring of the at least one memory controller 14 state information related to cache/memory lines managed by the cache coherence controller 17 thus can be observed.

The at least one memory controller 14 further comprises a memory management unit 15, operable for managing virtual, paged memory. By monitoring of the at least one memory controller 14 state information related to the memory management unit 15 thus can be observed. This state information may mainly be used to detect a set of dirty pages, which may be replicated according to embodiments of the invention. Cache coherency may be a major prerequisite for using the proposed method.

Advantageously it is detected whether memory mapped input/output operations are ongoing, and the snapshot creation procedure triggered based on the detection. The memory snapshot 40 is created in case there is no outstanding input/output operation and/or the primary computer system 10 is in a user-mode.

The memory replication controller 18 on the primary computer system 10 monitors the at least one memory controller 14 of the primary computer system 10, in particular, the memory bus of the memory controller 14, for an outstanding input/output operation.

The memory snapshot 40 may be transmitted to the alternate computer system 50 upon completion of the snapshot creation procedure.

The memory snapshot 40 received from the primary computer system 10, may be processed by loading the memory snapshot 40 and/or delta pages 42 of the main memory 16 of the primary computer system 10 to the alternate computer system 50; re-starting the network 68 and/or the input/output subsystem 70 on the alternate computer system 50; transferring states of the CPUs 12 of the primary computer system 10; and continuing execution of a primary image on the alternate computer system 50.

The memory replica is related to contents of the main memory 16 of the primary computer system 10 and/or hardware context information maintained by a processor 12 of the primary computer system 10 for executing software.

The network 68 and/or an input/output subsystem 70 is restarted before execution on the alternate computer system 50 is started.

Maintaining the memory replica on the alternate computer system 50 may further serve for spinning up a clone of the primary computer system 10.

Advantageously input/output activities of the primary computer system 10 may be throttled if there is no memory snapshot 40 created for a predefined time interval.

According to a further embodiment of the invention, the alternate computer system 50 is a backup computer system 50 in case of failure of the primary computer system 10.

Further, the alternate computer system 50 may be running an application of the primary computer system 10, in particular that two or more alternate computer systems are running applications of the primary computer system 10 in parallel.

A recovery unit 22 of the computer systems 10, 50 may provide spare cores if it detects failures of the primary computer system 10. These spare cores provided may be part of the alternate computer system 50. Thus, a CPU state of the primary computer system 10 can be transferred to the alternate computer system 50 by the recovery unit 22.

Filesystems may advantageously be hosted on the memory replica, representing the enterprise replicated storage. This means, that applications actually see the same files on both systems.

Further, if both computer systems 10, 50 are running at the same time, triggering a flash-copy of all used storage 26 and operating on the flash-copy or disallowing writing to persistent storage 26 may advantageously be provided.

Snapshot creation requires that a new snapshot may only be created if there is no outstanding I/O activity, and the system has to be in user-mode. This is important as the second system has own attached storage/network, with device IDs and device state. Input/output operations do not need to be virtualized, but it should be made sure a restart of the network/IO subsystem may be restarted before starting actual execution on the alternate computer system.

The memory replication controller (MRC) needs to detect relevant writes of the application. It monitors the transaction line buffer (TLB) for address and MOESI state concerning the state of caches and cache lines. A second write path to a dedicated delta memory may be provided. The memory replication controller detects memory writes and memory mapped input/output (MMIO) writes by address range. Thus, it knows when no MMIO write is in flight to set synchronization points.

Symmetric multi-processor systems (SMP systems) with multiple CPUs, which in general own private caches, must know for each page whether the current page is in the main memory or whether one of the cores "owns" a private copy of that page. In the latter case it is advantageous to provide the content of the private cache to the bus before a new snapshot is generated so that the memory replication controller can copy the content.

Concerning MMIO, in order to detect a valid synchronization, point the MRC needs to know if there are outstanding IO requests. Thus, the MRC monitors the MMIO address range that the appliance has set up via privileged calls. The MRC notices dirty pages in MMIO range. Thus, it knows when no MMIO write is in flight to set synchronization points.

In order to know where to move data on the alternate computer system the live memory may ramp up: add cores to the existing memory NVRAM memory which is instantly usable at DRAM speed. The snapshot file may be slow to recover.

For a storage replication and last synchronization point, a modification of enterprise storage behaviour may be provided. It may be made sure that the replicated storage is in synchronization with the last synchronization point.

Preparation of the alternate computer system may be performed by installing the base operating system, connecting storage and network, with storage being replicated disks from the primary computer system. The storage configuration may be site specific, as well as persisted on local and system specific storage. After the preparation is done, the alternate computer system may be freezed, with just the components filling the main memory needed to continue to actually work.

Creation of the first snapshot file may be performed as follows. For the alternate computer system being able to take over, it is required that a complete image of the complete memory of the primary computer system is available in the memory of the alternate computer system. The snapshot does not have to be current, but it does have to be consistent. For the transfer, zero pages, which are predominant at least during startup, may compress extremely well. For a long-running image with lots of memory pressure, it may take long and consume significant memory to create a first snapshot.

For startup of the alternate computer system, it may be made sure that a consistent memory snapshot is loaded to secondary system memory. Network and I/O layer may be restarted using alternate computer system specific low-level I/O configuration, optionally specific IP address but same file systems used by higher-level applications. It may be advantageous to trigger a flash-copy of all used storage and operate on the flash-copy or disallow writing to persistent storage if both systems are to be up and running at the same time. States of the CPUs may be transferred and execution of the primary image on the alternate system continued, allowing e.g. a cloned database to accept new query requests on same data. At this point, new memory updates are no longer inserted into memory. The memory replication controller just continues to update the stable snapshot file/delta memory. So, a re-synchronization would be possible based on a local disk snapshot later on.

It should be possible to continuously replicate all memory changes from one system to the other with e.g. less than 1 minute delay. The slower the network, the older the latest consistent snapshot on the alternate system and the larger the requirement for additional delta memory may be.

It may be possible to e.g. setup a database server A, spin up a clone image, interrupt memory synchronization, let analytics/reporting workload work on the clone (long-running transactions, usually in competition with OLTP workloads). Further it may be possible to re-synchronize the clone after analytics is done. This may be done at every time, having the memory snapshot file available. Thus, in case of a system crash, the alternate system could interrupt analytic work and be used as a fail-over target to take over the business critical transactional workload.

Figure 3:
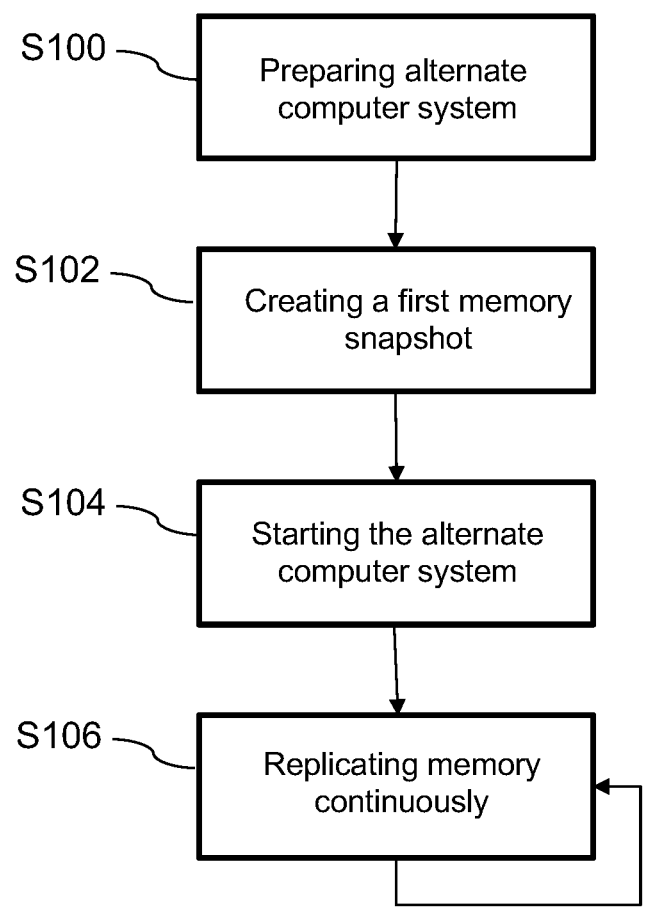
FIG. 3 depicts a flow chart for the proposed method for maintaining a memory replica of a primary computer system to be used by an alternate computer system according to an embodiment of the invention.

FIG. 3 depicts a flow chart for the proposed method for maintaining a memory replica of a primary computer system to be used by an alternate computer system according to an embodiment of the invention.

In step S100, the alternate computer system is prepared by installing an operating system, e.g. a microkernel operating system, connecting storage and network, wherein the storage being replicated disks from the primary computer system.

Preparation of the alternate computer system may be performed by installing the base operating system, connecting storage and network, with storage being replicated disks from the primary computer system. The storage configuration may be site specific, as well as persisted on local and system specific storage. After the preparation is done, the alternate computer system may be freezed, with just the components filling the main memory needed to continue to actually work.

In step S102, a first memory snapshot is created. Next the alternate computer system is started.

Creation of the first snapshot file may be performed as follows. For the alternate computer system being able to take over, it is required that a complete image of the complete memory of the primary computer system is available in the memory of the alternate computer system. The snapshot does not have to be current, but it does have to be consistent. For the transfer, zero pages, which are predominant at least during startup, may compress extremely well. For a long-running image with lots of memory pressure, it may take long and consume significant memory to create a first snapshot.

In step S104, the alternate computer system is started. For startup of the alternate computer system, it may be made sure that a consistent memory snapshot is loaded to secondary system memory. Network and I/O layer may be restarted using alternate computer system specific low-level I/O configuration, optionally specific IP address but same file systems used by higher-level applications. It may be advantageous to trigger a flash-copy of all used storage and operate on the flash-copy or disallow writing to persistent storage if both systems are to be up and running at the same time. States of the CPUs may be transferred and execution of the primary image on the alternate system continued, allowing e.g. a cloned database to accept new query requests on same data. At this point, new memory updates are no longer inserted into memory. The memory replication controller just continues to update the stable snapshot file/delta memory. So, a re-synchronization would be feasible based on a local disk snapshot later on.

Then, in step S106, the memory of the primary computer system is continuously replicated.

It should be possible to continuously replicate all memory changes from one system to the other with e.g. less than 1 minute delay. The slower the network, the older the latest consistent snapshot on the alternate system and the larger the requirement for additional delta memory may be.

It may be possible to e.g. setup a database server A, spin up a clone image, interrupt memory synchronization, let analytics/reporting workload work on the clone (long-running transactions, usually in competition with OLTP workloads). Further it may be possible to re-synchronize the clone after analytics is done. This may be done at every time, having the memory snapshot file available. Thus, in case of a system crash, the alternate system could interrupt analytic work and be used as a fail-over target to take over the business critical transactional workload.

Figure 4:
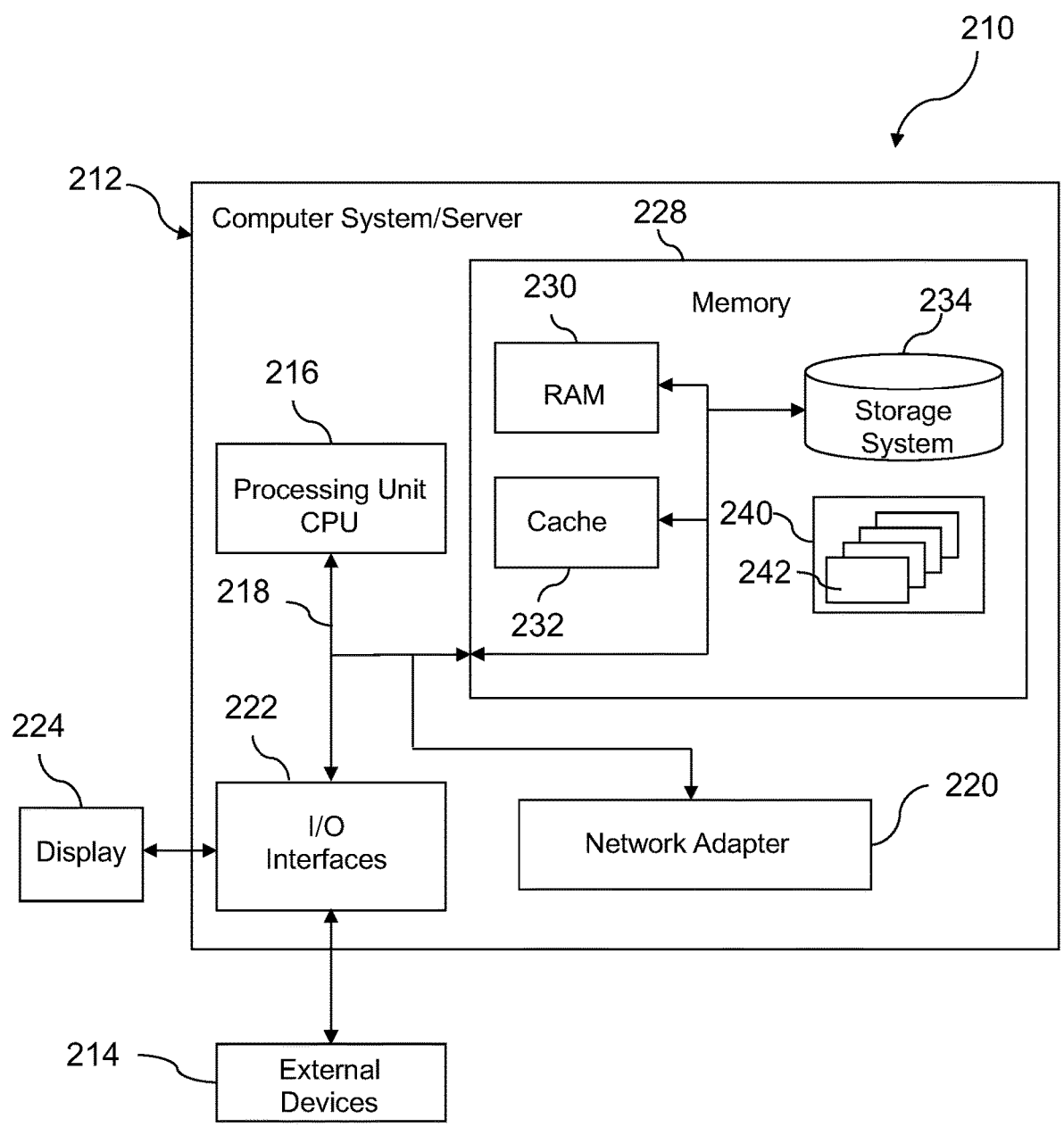
FIG. 4 depicts an example embodiment of a data processing system for executing a method according to the invention.

Referring now to FIG. 4, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for maintaining a memory replica of a primary computer system to be used by an alternate computer system, the method comprising:
   detecting changes performed on a memory device of the primary computer system by software executed on the primary computer system;
   monitoring at least one memory controller of the primary computer system;
   triggering, based on the monitoring, a snapshot creation procedure, the snapshot creation procedure comprising creating a memory snapshot that comprises the detected changes;
   loading the memory snapshot and/or delta pages of the memory of the primary computer system to the alternate computer system;
   re-starting a network and/or an input/output subsystem on the alternate computer system;
   transferring states of the CPUs of the primary computer system;
   continuing execution of a primary image on the alternate computer system; and
   disallowing writing to persistent storage if both the primary computer system and the alternate computer system are running at the same time.

2. The method according to claim 1, further detecting whether memory mapped input/output operations are ongoing and triggering the snapshot creation procedure based on the detecting.

3. The method according to claim 1, wherein the memory snapshot is created in case there is no outstanding input/output operation and/or the primary computer system is in a user-mode.

4. The method according to claim 3, wherein a memory replication controller on the primary computer system monitors the at least one memory controller of the primary computer system, in particular, the memory replication controller monitors a memory bus of the memory controller, in particular, if there is an outstanding input/output operation.

5. The method according to claim 1, further transmitting the memory snapshot to the alternate computer system upon completion of the snapshot creation procedure.

6. The method according to claim 1, wherein the at least one memory controller comprises a cache coherence controller and wherein the monitoring of the at least one memory controller comprises observing state information related to cache/memory lines managed by the cache coherence controller.

7. The method according to claim 6, wherein the at least one memory controller comprises a memory management unit, operable for managing virtual, paged memory, and wherein the monitoring of the at least one memory controller comprises observing state information related to the memory management unit.

8. The method according to claim 1, wherein the memory replica is related to contents of a main memory of the primary computer system and/or hardware context information maintained by a processor of the primary computer system for executing software.

9. The method according to claim 1, wherein a network and/or an input/output subsystem is restarted before execution on the alternate computer system is started.

10. The method according to claim 1, further comprising:
    preparing the alternate computer system by installing an operating system, connecting storage and network, wherein the storage being replicated disks from the primary computer system;
    creating a first memory snapshot;
    starting the alternate computer system;
    replicating the memory of the primary computer system continuously.

11. The method according to claim 1, wherein maintaining the memory replica on the alternate computer system serves for spinning up a clone of the primary computer system.

12. The method according to claim 1, wherein input/output activities of the primary computer system are throttled if there is no memory snapshot created for a predefined time interval.

13. The method according to claim 1, wherein continuing execution of a primary image on the alternate computer system comprises:
    hosting filesystems on the memory snapshot, representing an enterprise replicated storage, and wherein applications see a same file on both the primary computer system and the alternate computer system.

14. The method according to claim 1, further triggering a flash-copy of all used storage and operating on the flash-copy.

15. A computer program product for maintaining a memory replica of a primary computer system to be used by an alternate computer system, the computer program product comprising a computer readable storage medium having program instructions embodied therewith, the program instructions executable by the computer system to cause the computer system to perform a method comprising:
- detecting changes performed on a memory device of the primary computer system by software executed on the primary computer system;
- monitoring at least one memory controller of the primary computer system;
- triggering, based on the monitoring, a snapshot creation procedure, the snapshot creation procedure comprising creating a memory snapshot that comprises the detected changes;
- re-starting a network and/or an input/output subsystem on the alternate computer system;
- transferring states of the CPUs of the primary computer system;
- continuing execution of a primary image on the alternate computer system; and
- disallowing writing to persistent storage if both the primary computer system and the alternate computer system are running at the same time.

16. A computer system for execution of a data processing program comprising computer readable program instructions for performing a method, comprising:
- detecting changes performed on a memory device of the primary computer system by software executed on the primary computer system;
- monitoring at least one memory controller of the primary computer system; and
- triggering, based on the monitoring, a snapshot creation procedure, the snapshot creation procedure comprising creating a memory snapshot that comprises the detected changes;
- re-starting a network and/or an input/output subsystem on the alternate computer system;
- transferring states of the CPUs of the primary computer system;
- continuing execution of a primary image on the alternate computer system; and
- disallowing writing to persistent storage if both the primary computer system and the alternate computer system are running at the same time.

17. The computer system of claim 16, further comprising detecting whether memory mapped input/output operations are ongoing and triggering the snapshot creation procedure based on the detecting.

* * * * *